United States Patent [19]

Crosby

[11] Patent Number: 4,732,018
[45] Date of Patent: Mar. 22, 1988

[54] AIR COUPLING LOCKING DEVICE

[76] Inventor: Lyndon A. Crosby, 21 Pine St., East Millinocket, Me. 04430

[21] Appl. No.: 927,460

[22] Filed: Nov. 6, 1986

[51] Int. Cl.⁴ .......................................... E05B 73/00
[52] U.S. Cl. .................................... 70/19; 70/58; 70/14; 70/237
[58] Field of Search ......... 70/14, 19, 57, 58, 158–160, 70/163, 166, 167, 237; 280/507

[56] References Cited

U.S. PATENT DOCUMENTS

| | | | |
|---|---|---|---|
| 601,316 | 3/1898 | Dickson | 70/19 |
| 683,286 | 9/1901 | Houser | 70/19 X |
| 1,136,735 | 4/1915 | Taylor | 70/19 X |
| 1,330,657 | 2/1920 | Skinner | 70/14 |
| 1,395,525 | 11/1921 | Sagerman | 70/19 |
| 1,408,133 | 2/1922 | Ochs et al. | |
| 1,548,584 | 8/1925 | Dietrich | 70/19 |
| 1,585,962 | 5/1926 | Bray | 70/19 X |
| 2,560,624 | 7/1951 | Bartlett | |
| 2,963,895 | 12/1960 | Thomas | 70/14 |
| 3,091,011 | 5/1963 | Campbell | 70/58 X |
| 3,667,259 | 6/1972 | Reque et al. | 70/14 |
| 3,753,359 | 8/1973 | Frey | 70/19 |
| 3,826,114 | 7/1974 | Emerson | 70/14 |
| 3,926,018 | 12/1975 | Joersz | 70/19 |
| 3,941,408 | 3/1976 | Petersson | |
| 3,953,990 | 5/1976 | Nagel | 70/18 |
| 4,082,157 | 4/1978 | Sternberg | |
| 4,085,599 | 4/1978 | Fischer et al. | 70/14 |
| 4,164,131 | 8/1979 | Desmond et al. | 70/14 |
| 4,208,163 | 6/1980 | Holmqvist | |
| 4,226,103 | 10/1980 | Strickland | 70/57 X |
| 4,325,237 | 4/1982 | Menzie | 70/14 |
| 4,326,747 | 4/1982 | Finnegan | 70/19 |
| 4,366,683 | 1/1983 | Labbe et al. | 70/19 |
| 4,368,899 | 1/1983 | Smalley et al. | |
| 4,409,804 | 10/1983 | Sork | 70/14 |

FOREIGN PATENT DOCUMENTS

| | | | |
|---|---|---|---|
| 175600 | 3/1935 | Switzerland | 70/14 |
| 489155 | 7/1938 | United Kingdom | 70/19 |

Primary Examiner—Robert L. Wolfe
Assistant Examiner—Suzanne L. Dino
Attorney, Agent, or Firm—Daniel H. Kane, Jr.

[57] ABSTRACT

A safety and security locking device is described for use with pneumatic brake air couplings to prevent access to the air coupling opening for applying air pressure to release the brake. First and second elongate arms are pivotally joined at a pivot access between the ends for pivoting motion between an open position and a clamping locking position. One arm is formed at one end with a flange or cover for covering engagement over the air coupling opening. A locking guide or projection extends from the flange within the perimeter of the flange and is inserted in the opening for guiding the flange or cover over the air coupling opening or other inlet orifice. The second arm is formed with a brace at the same end for engaging the air coupling or orifice on the opposite side from the opening in clamping opposition with the flange. The opposite ends of the pivoting arms are formed with locking holes arrayed along at least one arc of the pivoting arms to coincide in a plurality of closed locking positions for inserting a lock through the coincident holes. The different locking positions accommodate air couplings or orifices of different sizes. In locking position the flange covers the opening and the guide projection prevents lateral withdrawal thereby preventing access to the air coupling opening.

13 Claims, 4 Drawing Figures

AIR COUPLING LOCKING DEVICE

TECHNICAL FIELD

This invention relates to locking devices and in particular to a new safety and security locking device for use with pneumatic brake air couplings to prevent access to the air coupling opening.

BACKGROUND ART

A variety of anti-theft and safety locking devices are described in the patent literature using pivoting arms in the configuration of clamps, jaws, tongs, or tong-like members. These locking devices are intended for a variety of applications from locking automobile doors, skis and compartments such as enclosures for electrical equipment, to securing pets and lap robes as shown in applicant's information disclosure list of references. The swinging members of the locking device may be used to secure or lock two elements together such as, for example a gate and a fence and for hitching a trailer to a tractor truck.

None of the references however describe a pivoting or scissor-like safety locking device capable of locking into, securing and preventing access to an air coupling or pneumatic coupling, for example for air brakes. More generally none of the references provide safety and security locking devices for engaging, covering and blocking openings, orifices and inlets.

OBJECTS OF THE INVENTION

It is an object of the present invention to provide a new safety and security locking device which locks onto an air brake air coupling so that air pressure cannot be applied through the air coupling opening to release the brake.

Another object of the invention is to provide an air brake air coupling locking device which is adjustable in size for accommodating and effectively locking air couplings and orifices and openings of different dimensions.

A general objective of the invention is to provide a safety and security locking device capable of engaging, covering and blocking openings, orifices, and inlets.

DISCLOSURE OF THE INVENTION

In order to accomplish these results the invention provides a safety and security locking device for use with pneumatic brake air couplings having an air coupling opening or inlet for applying air pressure to release the air brake. First and second elongate arms are pivotally joined at a pivot access between the ends of the respective arms for pivoting motion of the ends of the arms toward and away from each other between an open position and a clamping locking position.

According to the invention the first arm is formed at one end with a flange or cover for covering engagement over the air coupling opening or other inlet orifice. A locking guide or projection extends from the flange within the perimeter of the flange and is inserted in the air coupling opening for guiding the flange or cover over the air coupling opening. The second arm is formed with a brace or bearing surface for clamping engagement with the air coupling or other inlet on the opposite side from the opening. The bracing surface cooperates with the flange to achieve the opposing clamping motion.

In the preferred example embodiment one of the first and second arms at the flange and brace end is offset at the end from a line through the pivot access. Spacing the flange and brace from each other in the closed locking position to accommodate the dimensions of an air coupling or other inlet opening. The arms are formed at the opposite ends from the flange and brace with locking holes positioned and arranged to coincide in a closed locking position for inserting a lock through the coincident locking holes. A feature and advantage of the invention is that the locking device is locked and held in the locking position with the flange covering the opening and the guide projection preventing lateral withdrawal of the locking device. Access to the air coupling for applying air pressure to release the air brake is thereby prevented.

According to another feature of the invention an array of locking holes is provided with the holes arranged for coinciding at a plurality of different closed locking positions for use with different air coupling dimensions and with inlet openings and orifices of different sizes. At least one of the arms is formed with an extension so that the holes can be arrayed along an arc of the pivoting arms. At least one hole in each arm may also be formed along a second arc for coincidence at an intermediate locking position between locking positions of coincident holes of the first arc.

Other objects, features and advantages of the invention are apparent in the following specification and accompanying drawings.

DESCRIPTION OF PREFERRED EXAMPLE EMBODIMENTS AND BEST MODE OF THE INVENTION

Figure 1:
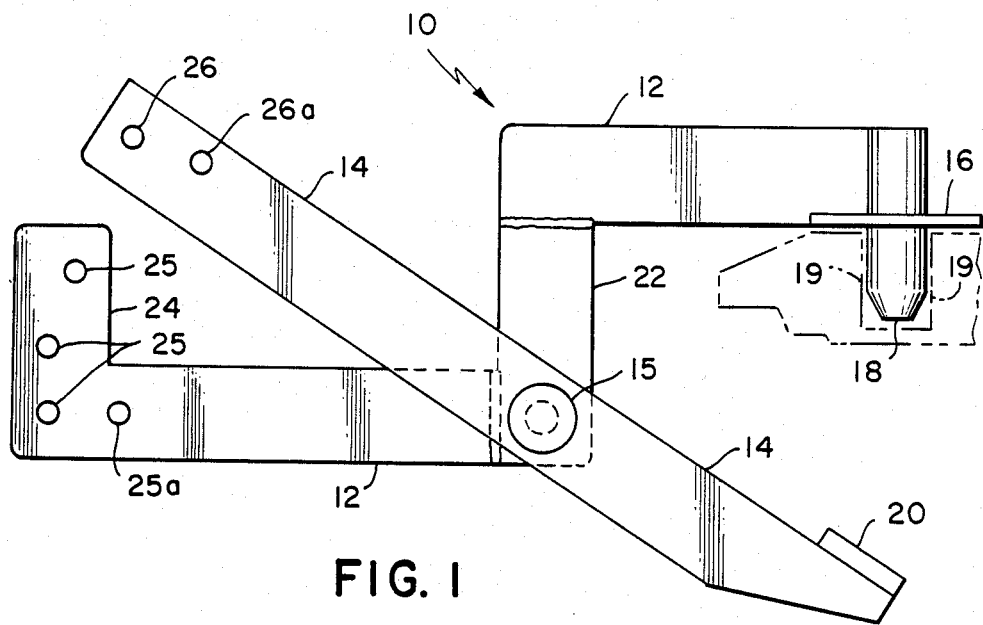
FIG. 1 is a side elevation view of the safety and security locking device with the scissor-like arms in an open position.
Figure 2:
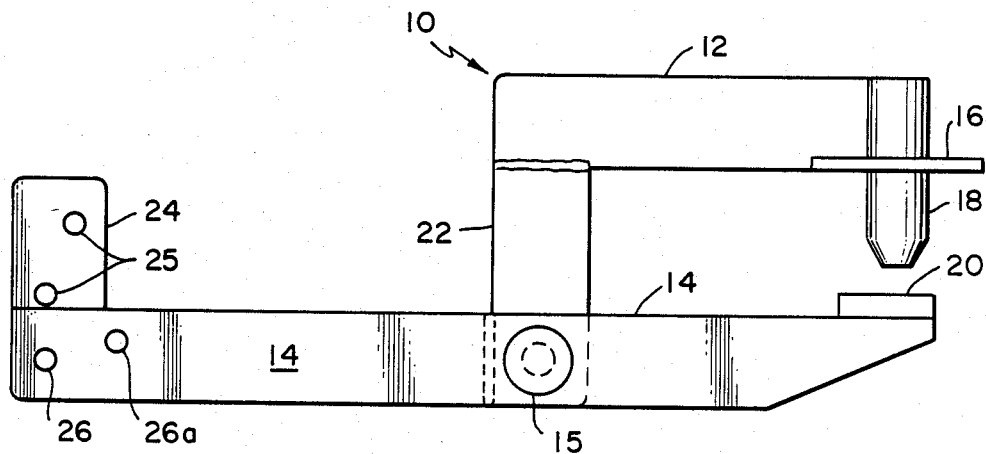
FIG. 2 is another side elevation view of the safety and security locking device with scissor-like arms in a closed locking position.
Figure 3:
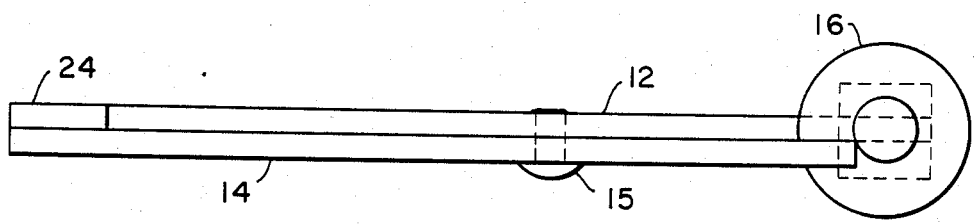
FIG. 3 is a top plan view and FIG. 4 is a front view of the safety and security locking device in the locking position illustrated in FIG. 2.
Figure 4:
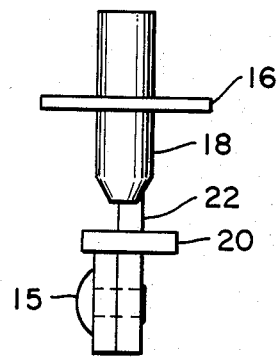

A safety and security locking device 10 according to the present invention is illustrated in FIGS. 1 through 4. A pair of first and second elongate arms 12 and 14 are pivotally joined at pivot axis 15 which may be for example a rivet rigidly welded or secured to one arm 12, for pivoting motion of the other arm 14, relative to the rivet and rivet head. The arms pivot between an open position shown in FIG. 1 for placement over an opening, orifice or inlet, and a closed locking position shown in FIGS. 2 through 4.

Arm 12 is formed at one end with a flange 16 for covering the opening, inlet or orifice for example of an air brake air coupling. A locking guide or projection 18 within the perimeter of flange 16 and extending from the center of flange 16 is inserted into the inlet opening or orifice and guides the flange over the air coupling opening. In the locking position, the guide 18 extends into the opening, inlet or orifice and prevents lateral withdrawal of the locking device while the flange 16 is formed with sufficient surface area to provide a cover over the opening.

The arm 14 is formed at the same end with a brace or bearing surface 20 for clamping engagement against the opposite side of the air coupling from the opening or inlet. The flange 16 and bracing surface 20 therefore provide the opposing surfaces for clamping over and covering an air coupling inlet opening while the guide projection, protrusion, or stem 18 prevents lateral withdrawal.

Arm 12 is formed at its flange end with an offset extension 22 offsetting and spacing the flange 16 from brace 20 to accommodate the dimensions of an air coupling or similar inlet opening or orifice. The offset extension may of course be formed in either or both of the arms 12 and 14 in order to provide the appropriate spacing.

Arms 12 and 14 are formed at the ends opposite flange 16 and brace 20 with locking holes arranged to coincide in a closed locking position for inserting a lock to secure the device. In order to accommodate variable size air couplings or similar inlets and orifices, the arm 12 is formed at the opposite end from flange 16 with an orthogonal locking hole extension 24 with an array of spaced holes 25. The holes 25 are positioned to establish a desired range of locking positions for air coupling, inlets and orifices of different sizes. Holes 26 formed in the end of arm 14 coincide with the holes 25 for inserting a lock at the different locking positions.

For economy of space, the holes 25 and 26 are formed along two arcs of the pivoting arms 12 and 14. Thus holes 25a and 26a are formed along a second arc for coincidence at an intermediate or incrementally lower or higher locking position between below, or above coincident holes 25 and 26 of the first arc. The locking hole extension may of course be formed on either or both of the arms 12 and 14.

While the invention has been described with reference to a preferred example embodiment it is intended to cover all modifications and equivalence within the scope of the following claims.

I claim:

1. A safety and security locking device in combination with a pneumatic brake air coupling having an air coupling opening for applying air pressure to release an air brake, said locking device comprising:

a pair of first and second elongate arms pivotally joined at a pivot axis between the ends of the respective arms for pivoting motion of the ends of the arms toward and away from each other between an open position and a clamping locking position;

said first arm comprising at one end a flange means constructed and arranged for covering engagement over the air coupling opening and a locking guide projection within the perimeter of the flange means for guiding the flange means over the air coupling opening with the projection entering and extending into the opening and holding the locking device on the air coupling, said second arm comprising at the same end a brace means for clamping engagement with the air coupling on the opposite side from the opening in cooperation with the flange means holding the locking guide projection inside the air coupling opening and the flange means covering over the air coupling opening;

said first and second arms each comprising at the opposite end from the cooperating flange means and brace means at least one locking hole, said holes being positioned and arranged to coincide in a closed locking position for inserting a lock through the coincident locking holes whereby the locking device is locked and held in the locking position with the flange means covering the opening and the locking guide projection preventing lateral withdrawal of the locking device thereby preventing access to the air coupling opening.

2. The safety and security locking device of claim 1 wherein at least one of said first and second arms at the flange means and brace means end is offset at the end from a line through the pivot axis thereby spacing the flange means and brace means from each other in the closed locking position in order to accommodate the dimensions of the air coupling.

3. The safety and security locking device of claim 2 wherein an offset is formed in the first arm comprising the flange means at the end and the second arm comprising the cooperating brace means is substantially straight.

4. The safety and security locking device of claim 1 wherein the first and second arms are each formed at the ends opposite the flange means and brace means with a plurality of holes arranged for coinciding at a plurality of different closed locking position for use with different air coupling dimensions.

5. The safety and security locking device of claim 1 wherein at least one of the first and second arms at the locking hole end comprises an extension substantially orthogonal to the arm extending in the direction of the other arm and formed with a plurality of locking holes along a first arc of the pivoting arms for coincidence with at least one locking hole of the other arm for locking in a plurality of different locking positions.

6. The safety and security locking device of claim 5 wherein both arms comprise a plurality of coincident locking holes.

7. The safety and security locking device of claim 6 wherein at least one hole of each arm is formed along a second arc of the pivoting arms for coincidence at an intermediate locking position between locking positions of coincident holes of the first arc.

8. The safety and security locking device of claim 5 wherein the extension is formed on the first arm and the second arm is substantially straight.

9. A safety and security locking device in combination with a pneumatic brake air coupling having an air coupling opening for applying air pressure to release an air brake, said locking device comprising:

a pair of first and second elongate arms pivotally joined at a pivot axis between the ends of the respective arms for pivoting motion of the ends of the arms toward and away from each other between an open position and a clamping locking position;

said first arm comprising at one end a flange means constructed and arranged for covering engagement over the air coupling opening and a locking guide projection within the perimeter of the flange means for guiding the flange means over the air coupling opening with the projection entering and extending into the opening and holding the locking device on the air coupling, said second arm comprising at the same end a brace means for clamping engagement with the air coupling on the opposite side from the opening in cooperation with the flange means holding the locking guide projection inside the air coupling opening and the flange means covering over the air coupling opening;

said first and second arms each comprising at the opposite end from the cooperating flange means and brace means at least one locking hole, said holes being positioned and arranged to coincide in a closed locking position for inserting a lock through the coincident locking holes whereby the locking device is locked and held in the locking position with the flange means covering the air coupling opening and the locking guide projection preventing lateral withdrawal of the locking device thereby preventing access to the air coupling opening;

at least one of said first and second arms at the flange means and base means end being offset at the end from a line through the pivot axis thereby spacing the flange means and base means from each other in the closed locking position in order to accommodate the dimensions of the air coupling;

at least one of the first and second arms at the locking hole end comprising an extension substantially orthogonal to the arm formed with a plurality of locking holes through the extension along a first arc of the pivoting arms for coincidence with at least one locking hole of the other arm in a plurality of different locking positions.

10. The safety and security locking device of claim 9 wherein both arms comprise a plurality of locking holes and wherein at least one hole of each arm is formed along a second arc for coincidence at an intermediate locking position between locking positions of coincident holes of the first arc.

11. A safety and security locking device in combination with a pneumatic brake air coupling having an air coupling opening for applying air pressure to release an air brake, said locking device comprising:

clamp means comprising pivotally joined arms formed at one end with cooperating air coupling opening engaging means and bracing means for engaging an air coupling in a clamping position, said arms being formed at the other end with cooperating locking holes arranged for coincidence of locking holes in the clamping position for receiving a lock, said arms being pivotally joined at a pivot axis between said respective ends of the arms, said air coupling opening engaging means comprising a flange constructed and arranged for covering over the air coupling opening and a holding projection for inserting into and holding the clamp means in the air coupling opening.

12. The safety and security locking device of claim 11 wherein the pivotally joined arms are joined at a pivot axis and the arms define lines through the pivot axis and wherein at least one of said air coupling opening engaging means and bracing means is offset from the respective line through the pivot axis to accommodate the dimensions of an air coupling in the clamping position.

13. The safety and security locking device of claim 11 wherein at least one of the arms comprises at the cooperating locking hole end an extension generally orthogonal to the arm formed with a plurality of locking holes along an arc of the pivoting arms for coincidence of locking holes in a plurality of different clamping positions to accommodate different size air couplings.

* * * * *